United States Patent
Li et al.

(10) Patent No.: US 8,049,635 B2
(45) Date of Patent: Nov. 1, 2011

(54) APPARATUS AND METHOD FOR PROCESSING INPUT SIGNALS

(75) Inventors: Kun Li, Shenzhen (CN); Ze-Ping Liu, Shenzhen (CN); Fa-Yin Liu, Shenzhen (CN); Mun-Chong Tong, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 386 days.

(21) Appl. No.: 12/211,059

(22) Filed: Sep. 15, 2008

(65) Prior Publication Data

US 2010/0001869 A1    Jan. 7, 2010

(30) Foreign Application Priority Data

Jul. 1, 2008    (CN) .......................... 2008 1 0302471

(51) Int. Cl.
G08B 21/00    (2006.01)

(52) U.S. Cl. .................. 340/635; 340/815.75; 340/5.65

(58) Field of Classification Search .................. 340/635, 340/636.11–636.13, 641, 3.7, 5.32, 5.65, 340/815.66, 815.75
See application file for complete search history.

(56) References Cited

U.S. PATENT DOCUMENTS

| 4,153,877 | A  | * | 5/1979  | Fathauer et al. ................. 455/76 |
| 6,163,867 | A  | * | 12/2000 | Miller et al. ................... 714/736 |
| 7,114,108 | B2 | * | 9/2006  | Park et al. ...................... 714/719 |
| 7,434,118 | B2 | * | 10/2008 | Moessinger et al. .......... 714/715 |
| 2007/0239392 | A1 | * | 10/2007 | Ko ................................. 702/124 |
| 2007/0266290 | A1 | * | 11/2007 | Yamada et al. ................ 714/742 |
| 2009/0146677 | A1 | * | 6/2009  | Matsumoto et al. .......... 324/763 |
| 2010/0295609 | A1 | * | 11/2010 | Fennell ...................... 330/124 R |

* cited by examiner

*Primary Examiner* — Daniel Previl
(74) *Attorney, Agent, or Firm* — Altis Law Group, Inc.

(57) ABSTRACT

An apparatus for processing input signals includes a signal receiver, a comparator, first and second drivers, and a calculator. The signal receiver is used for receiving input signals. The comparator compares the input signals with predetermined signals and generates unit signals representing a corresponding comparison result. The first driver generates first drive signals according to the unit signals. The calculator generates a result signal according to the unit signals. The second driver generates a second drive signal according to the result signal.

14 Claims, 3 Drawing Sheets

APPARATUS AND METHOD FOR PROCESSING INPUT SIGNALS

BACKGROUND

1. Field of the Invention

The present invention relates to apparatuses and methods for processing input signals, and particularly relates to an apparatus and a method for processing input signals from an input device.

2. Description of Related Art

In the mass production of input devices, such as keyboards or mice, electronic testing apparatuses are used for testing the input devices. For testing purposes, the input devices are installed in the electronic testing apparatuses. Subsequently, the electronic testing apparatuses receive signals from the input devices to determine whether the input devices are qualified, both physically as well as functionally.

In addition to the electronic testing apparatuses being costly, the repeated installations of separate input devices tend to damage the electronic testing apparatuses. Furthermore, the electronic testing apparatuses are often equipped with testing software, thereby further increasing the cost of the testing process.

DETAILED DESCRIPTION

Figure 1:
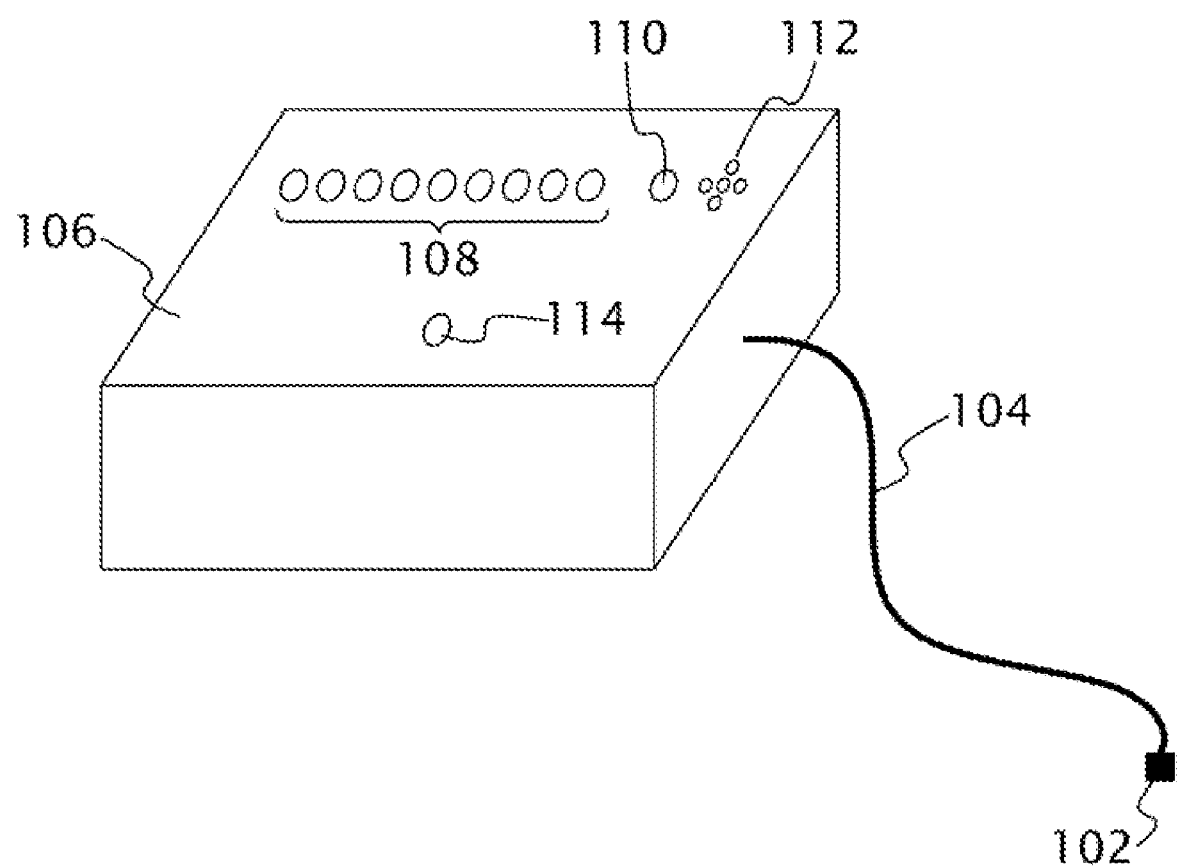
FIG. 1 is an isometric view of an apparatus for processing input signals in accordance with an exemplary embodiment, the apparatus including a control body.

Referring to FIG. 1, an apparatus for processing input signals in accordance with an exemplary embodiment includes an input interface 102, a data cable 104, a control body 106, a plurality of first instruction lights 108, a second instruction light 110, an alarm 112, and a reset key 114.

The input interface 102 is configured for connecting to input devices (not shown) to be tested. The input interface 102 corresponds to output interfaces of the input devices, such as PS/2 or USB ports.

The data cable 104 is connected between the input interface 102 and the control body 106 for transmitting the signal received by the input interface 102 to the control body 106.

The control body 106 is used for determining whether the input device and its operational units are qualified, subsequently generating corresponding instruction signals. The first instruction lights 108, the second instruction light 110, the alarm 112, and the reset key 114 are all installed to the control body 106, and are driven by the control body 106 to record whether the input device and its operational units are qualified. The first instruction lights 108 are used for indicating whether the present operational unit of the coupled input device is qualified. In this embodiment, the number of the first instruction lights 108 is equal to the number of the operational units making up the coupled input device, wherein each first instruction light 108 corresponds to an operational unit and indicates whether the corresponding operational unit is qualified. The second instruction light 110 is used for indicating whether the input device is qualified. The alarm 112 is used for alerting when the control body 106 determines that the input device is unqualified. The control body 106 can be reset by pressing the reset key 114. When all of the operational units of the input device have been determined to be qualified, the control body 106 drives the second instruction light 110 to indicate that the input device is qualified. When any one of the operational units have been determined to be unqualified, the control body 106 drives the second instruction light 110 to indicate that the input device is unqualified, and drives the alarm 112 to sound.

Figure 2:
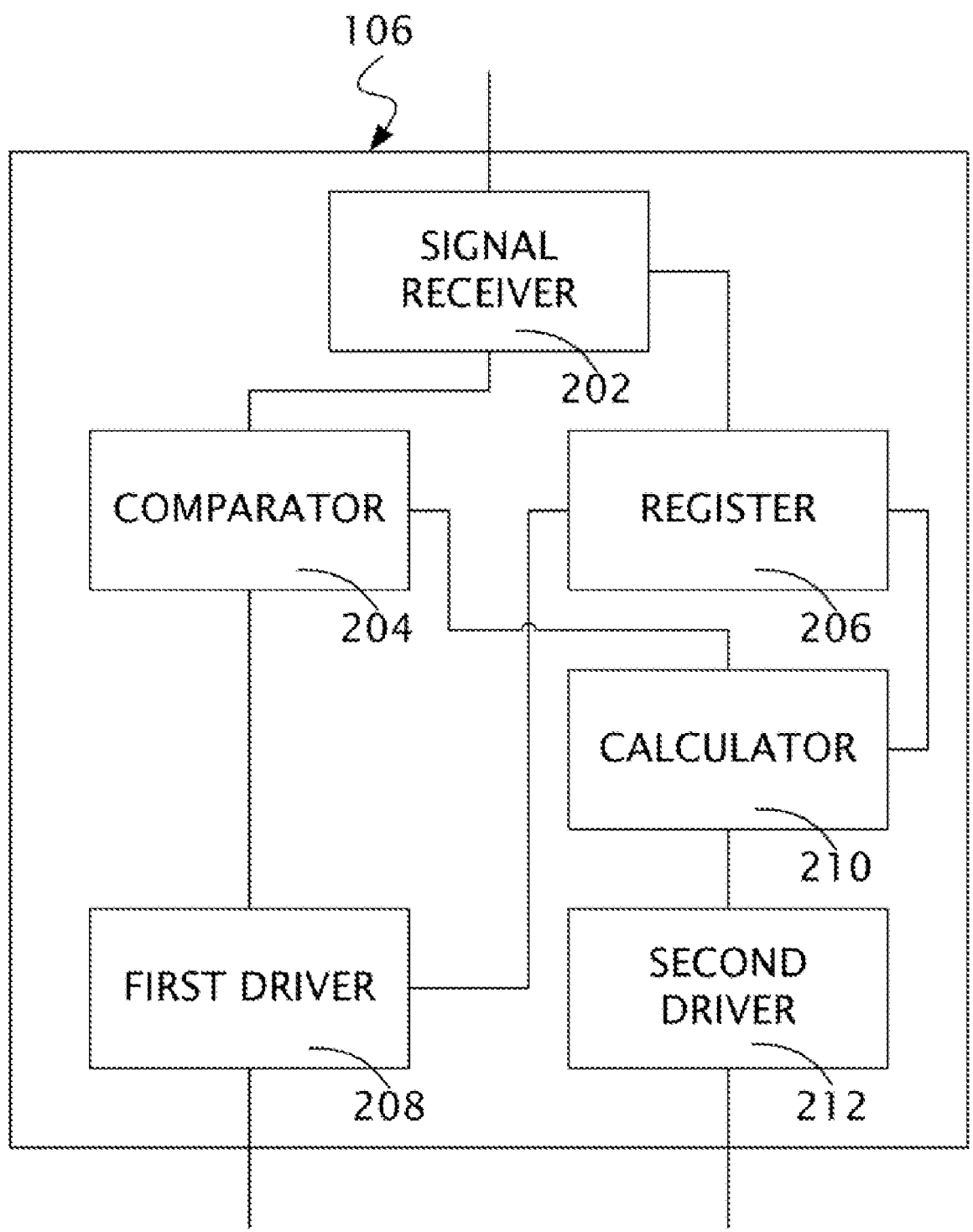
FIG. 2 is a block diagram of the control body of FIG. 1.

Referring to FIG. 2, the control body 106 includes a signal receiver 202, a comparator 204, a register 206, a first driver 208, a calculator 210, and a second driver 212.

The signal receiver 202 is connected to the data cable 104 to receive the signals from the input devices. Generally, the signals from the input devices include an operational signal of a present operational unit of the input device, along with a tag signal of the present operational unit. The signal receiver 202 subsequently forwards the operational signal to the comparator 204, and forwards the tag signal to the register 206.

The comparator 204 is connected to the signal receiver 202. The comparator 204 compares the operational signal with a predetermined signal, to determine if the present operational unit is qualified. The predetermined signal can be a qualified signal generated by a qualified operational unit and pre-stored in the control body 106. The comparator 204 generates a unit signal representing whether the present operational unit is qualified or not. The unit signal is transmitted to the first driver 208 and the calculator 210.

The register 206 is connected to the signal receiver 202 and includes a plurality of tag spaces for storing the tag signals of the operational units. The number of tag spaces is equal to the number of operational units of the input device. The register 206 generates a status signal indicating whether all the tag spaces have been stored with the tag signals. The register 206 transmits the status signal to the calculator 210.

The first driver 208 is connected to the comparator 204 and the register 206. The first driver 208 is also connected to the first instruction lights 108 to drive the first instruction lights 108 to indicate whether the present operational unit of the input device is qualified according to the unit signal. The first driver 208 generates a first drive signal according to the unit signal from the comparator 204, and sends the first drive signal to a corresponding first instruction light 108 based on the tag signal read from the register 206.

The calculator 210 is connected to the comparator 204 and the register 206. The calculator 210 determines whether the input device is qualified according to the unit signal and the status signal. If at least one unit signal indicates the present operational unit is unqualified, the calculator 210 generates a result signal representing the input device as unqualified. If the unit signal indicates the present operational unit is qualified and the status signal indicates that the register 206 is "full", the calculator 210 generates the result signal representing the present input device as qualified. The result signal is transmitted to the second driver 212.

The second driver 212 is connected to the calculator 210, the second instruction light 110, and the alarm 112, used for driving the second instruction light 110 and the alarm 112 to indicate if the input device is qualified. The second driver 212 generates a second drive signal according to the result signal, and sends the second drive signal to the second instruction light 110 and the alarm 112.

Figure 3:
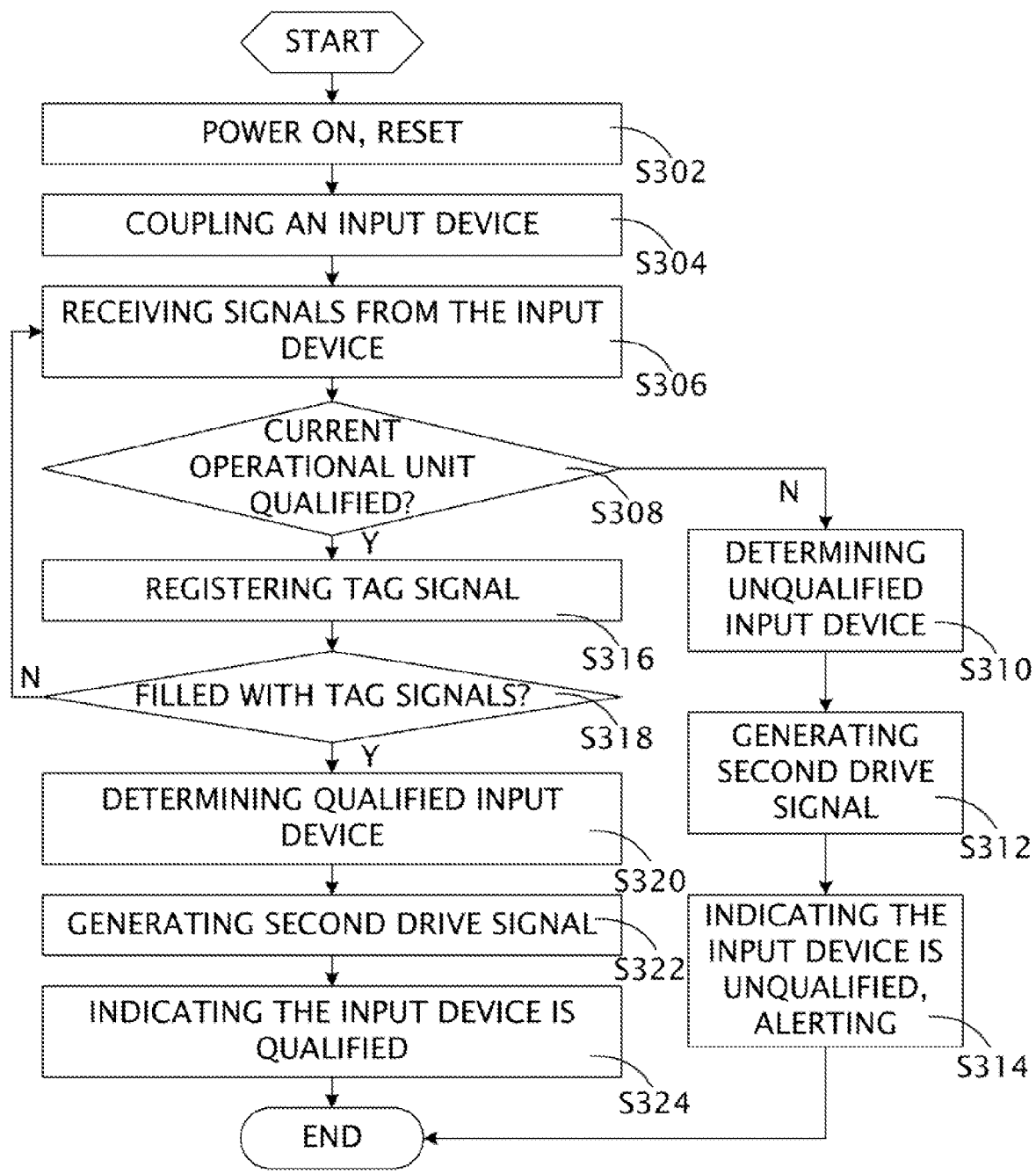
FIG. 3 is a flow chart of a method for processing input signals in accordance with an exemplary embodiment.

Referring to FIG. 3 and taking the above apparatus as an example, a method for processing input signals in accordance with an exemplary embodiment may include the following steps.

Step S302, the apparatus is powered on and reset. Resetting the apparatus can be triggered by operating the reset key 114. Inside of the apparatus, the resetting includes: the first instruction lights 108, the second instruction light 110, and the alarm 112 return default, the comparator 204 of the control body 106 defaults, and the register 206 is cleared.

Step S304, coupling the input interface 102 with the input device to be tested, wherein the input interface 102 receives the signal from the coupled input device.

Step S306, the signal receiver 202 receives the signal from the input interface 102 through the data cable 104 and transmits the operational signal of the present operational unit of the input device to the comparator 204. The signal receiver 202 further transmits the tag signal to the register 206.

Step S308, the comparator 204 compares the operational signal with the predetermined signal to determine whether the present operational unit is qualified.

Step S310, when the present operational unit is unqualified, the calculator 210 generates the result signal according to the unit signal generated by the comparator 204, indicating that the input device is unqualified.

Step S312, the second driver 212 generates the second drive signal according to the result signal, and sends the second drive signal to the second instruction light 110 and the alarm 112.

Step S314, the second instruction light 110 indicates that the coupled input device is unqualified according to the second drive signal, and the alarm 112 sounds.

Step S316, when the present operational unit is qualified, the register 206 stores the tag signal and, subsequently, generates a status signal according to the storage status and sends the status signal to the calculator 210.

Step S318, when the status signal indicates that the register 206 is not filled with the tag signals, step S306 is going on to receive the signal from a next operational unit of the input device.

Step S320, when the status signal indicates that all tag spaces of the register 206 are stored with tag signals, the calculator 210 calculates according to the unit signal and the status signal to determine that the input device is qualified. The calculator 210 generates and sends the result signal to the second driver 212.

Step S322, the second driver 212 generates second drive signals according to the result signal, and sends the second drive signals to the second instruction light 110.

Step S324, the second instruction light 110 indicates that the input device is qualified.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An apparatus for processing at least one input signal comprising:
    a signal receiver for receiving the at least one input signal;
    a comparator for comparing the at least one input signal with at least one corresponding predetermined signal, and generating at least one unit signal representing a corresponding comparison result;
    a first driver for generating at least one first drive signal according to the at least one unit signal;
    a calculator for generating a result signal according to the at least one unit signal; and
    a second driver for generating a second drive signal according to the result signal.

2. The apparatus of claim 1, wherein the at least one unit signal represents a qualification status of the corresponding input signal.

3. The apparatus of claim 2, further comprising at least one light capable of being driven by the corresponding first drive signal to indicate the qualification status of the corresponding input signal.

4. The apparatus of claim 1, further comprising a light capable of being driven by the second drive signal to indicate a qualification status of a signal source from which the at least one input signal is generated.

5. The apparatus of claim 4, further comprising an alarm capable of being driven by the second drive signal to sound if the result signal indicates the signal source as unqualified.

6. The apparatus of claim 4, wherein the calculator determines the signal source as unqualified if any one of the at least one unit signal represents the corresponding input signal as unqualified, and determines the signal source as qualified if all unit signals represents the corresponding input signal as qualified.

7. The apparatus as described in claim 1, further comprising a register for storing a tag of the at least one input signal.

8. The apparatus as described in claim 7, wherein the register comprises at least one tag space corresponding to the at least one input signal.

9. The apparatus as described in claim 8, wherein the register is configured for generating a status signal indicating a storage status of the at least one tag space.

10. A method for receiving at least one input signal comprising:
    receiving the at least one input signal;
    comparing the at least one input signal with a corresponding predetermined signal, and generating a unit signal accordingly;
    indicating the unit signal;
    determining qualification status of a signal source of the at least one input signal according to the corresponding unit signal; and
    indicating the determination.

11. The method as described in claim 10, wherein the unit signal indicates the qualification status of the corresponding input signal.

12. The method as described in claim 11, further comprising: determining the signal source as unqualified if any one unit signal indicates the corresponding at least one input signal as unqualified.

13. The method as described in claim 1, further comprising: determining the signal source as qualified if all unit signals indicate the corresponding at least one input signal as qualified.

14. The method as described in claim 13, further comprising:
    registering a tag of the at least one input signal;
    determining the signal source as qualified if all tags of the input signals are registered and all of the at least one unit signal indicates the corresponding at least one input signal as qualified.

* * * * *